(12) United States Patent
Bowling

(10) Patent No.: US 6,629,685 B2
(45) Date of Patent: Oct. 7, 2003

(54) METHOD AND APPARATUS FOR PULLING WIRE

(76) Inventor: Roy E. Bowling, 6691 W. 10th Pl., Lakewood, CO (US) 80214

( * ) Notice: Subject to any disclaimer, the term of this patent is extended or adjusted under 35 U.S.C. 154(b) by 320 days.

(21) Appl. No.: 09/811,091

(22) Filed: Mar. 16, 2001

(65) Prior Publication Data

US 2002/0130307 A1 Sep. 19, 2002

(51) Int. Cl.$^7$ ................................................ E21C 29/16
(52) U.S. Cl. ............................................. 254/134.3 FT
(58) Field of Search .......................... 254/134.3 FT, 254/134.3 R; 294/74, 86.42; 24/122.3, 122.6, DIG. 16, DIG. 17

(56) References Cited

U.S. PATENT DOCUMENTS

| | | |
|---|---|---|
| 832,343 A | 10/1906 | Scott |
| 832,401 A | 10/1906 | Martin |
| 1,114,637 A | 10/1914 | Nolan |
| 1,521,789 A | 1/1925 | Oswald |
| 1,686,250 A | 10/1928 | Page |
| 1,732,410 A | 10/1929 | Martin |
| 1,802,657 A | 4/1931 | Kellems |
| 1,807,993 A | 6/1931 | Martin |
| 1,994,674 A | 3/1935 | Van Inwagen |
| 2,112,281 A | 3/1938 | Ferris |
| 2,181,392 A | 11/1939 | Chatham |
| 2,268,598 A | 1/1942 | Kellems |
| 2,434,358 A | 1/1948 | Frank |
| 2,602,207 A | 7/1952 | Kellems |
| 2,698,150 A | 12/1954 | Palma |
| 2,740,178 A | 4/1956 | Kellems |
| 2,766,501 A | 10/1956 | Kellems |
| 3,133,725 A | 5/1964 | Lanum |
| 3,136,844 A | 6/1964 | Peterson |
| 3,137,765 A | 6/1964 | Lanum |
| 3,192,617 A | 7/1965 | Meyer |
| 3,291,507 A | 12/1966 | Clay |
| 3,431,947 A | 3/1969 | Hines |
| 3,551,959 A | 1/1971 | Mastalski |
| 3,599,913 A | 8/1971 | DiPalma |
| 3,932,697 A | 1/1976 | Hood |
| 4,055,875 A | 11/1977 | Strickland |
| 4,083,532 A | * 4/1978 | Pola .................. 254/134.3 FT |
| 4,225,172 A | 9/1980 | Marquardt |
| 4,368,910 A | 1/1983 | Fidrych |
| 4,453,291 A | 6/1984 | Fidrych |
| 5,480,203 A | 1/1996 | Favalora |

FOREIGN PATENT DOCUMENTS

| | | |
|---|---|---|
| DE | 1079398 | 4/1960 |
| DE | 3040760 | 5/1982 |

* cited by examiner

Primary Examiner—Robert C. Watson
(74) Attorney, Agent, or Firm—Ralph F. Crandell

(57) ABSTRACT

A method and apparatus or tool for pulling wire through a wall or panel formed by spaced apart vertical studs, a plate at one end of said studs, and opposed wall panels mounted on said studs. An opening is cut through one of the wall panels between the studs and a hole is drilled in the plate using a long, flexible drill bit. A wire stringing tool formed by an elongated stiffly flexible rod at least partially covered with an elongated, flexible, expandable and contractible woven sleeve is inserted through the opening between the panels and through the drilled hole. The rod and sleeve is slightly retracted to form a loop in the sleeve at the inserted end of the sleeve-covered rod. The loop in the sleeve is hooked with an elongated hooking rod and the sleeve is pulled through the hole to position its other cut end at a point remote therefrom. A wire is inserted into and gripped by the sleeve by applying tension to the sleeve, and the wire is pulled through the hole and opening to string the wire between the remote point and the wall or panel opening.

9 Claims, 8 Drawing Sheets

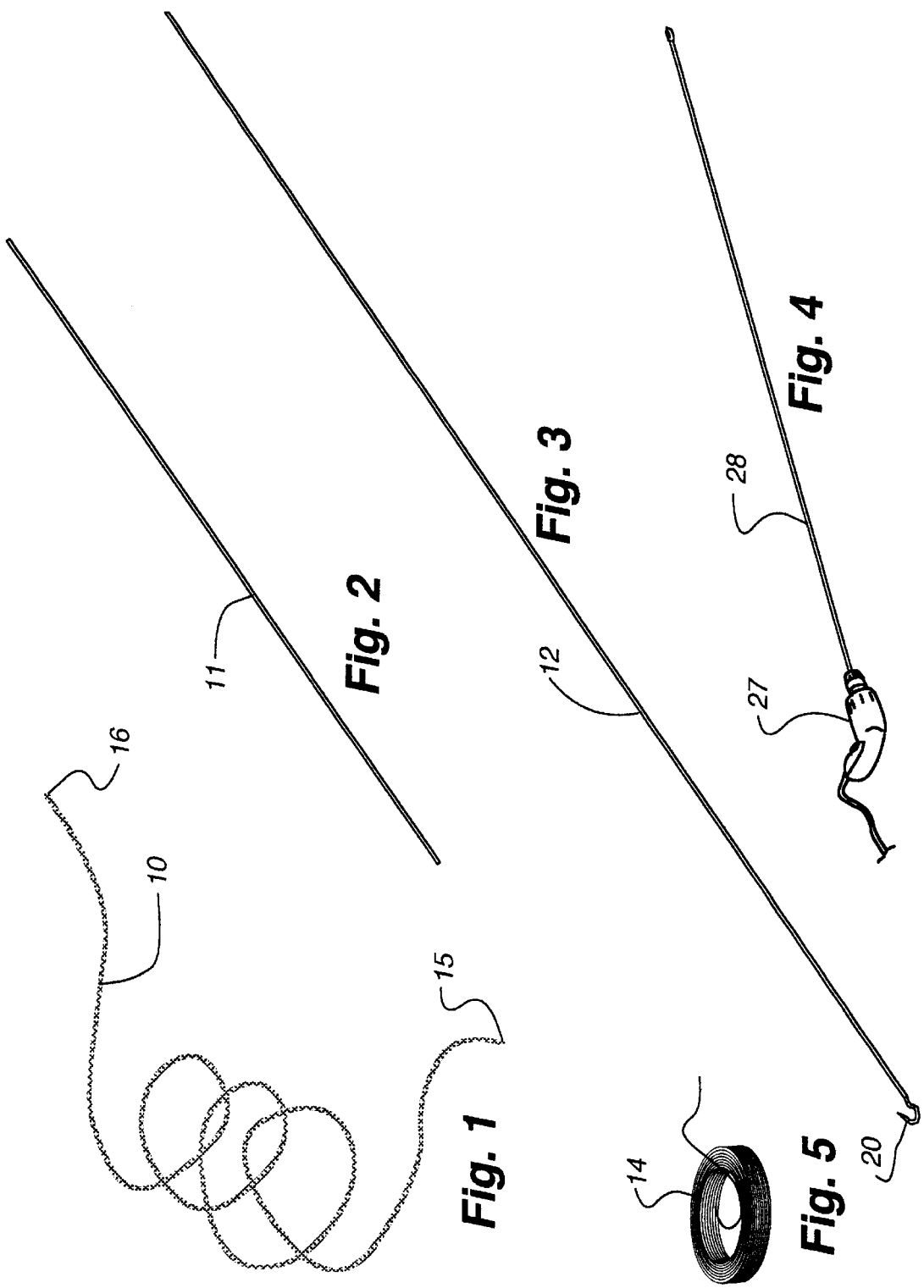

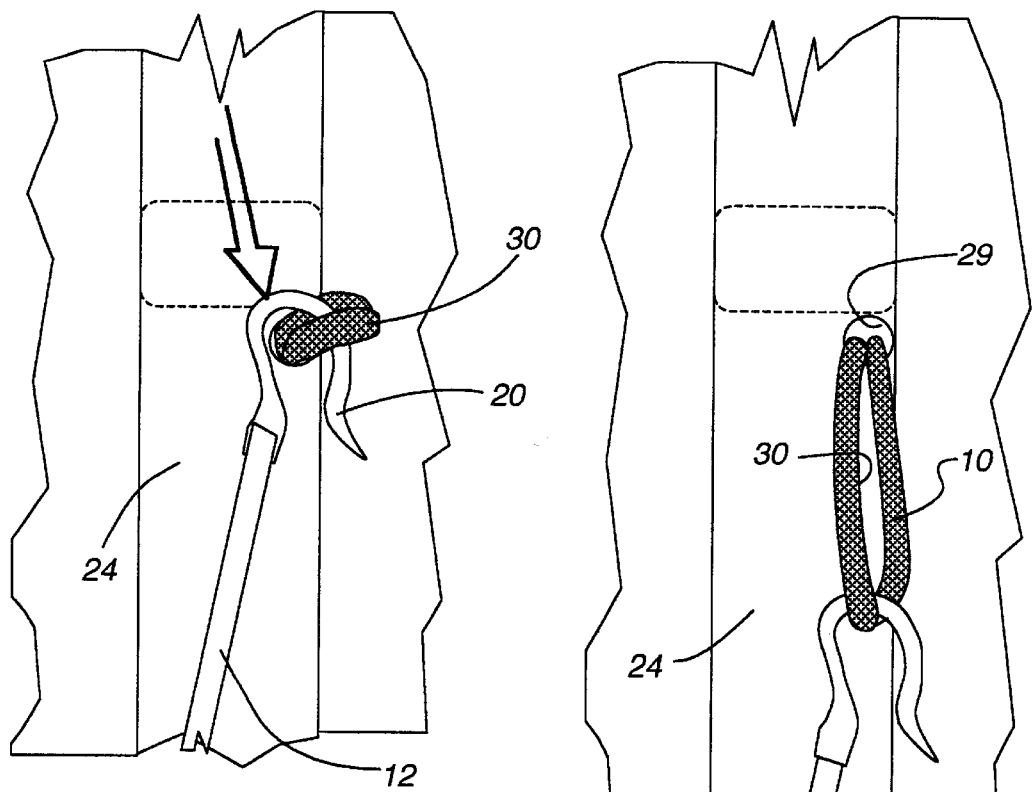
*Fig. 12D*
*Fig. 12E*
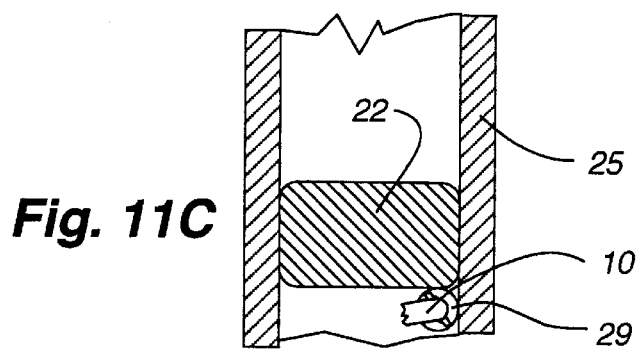
*Fig. 11C*

METHOD AND APPARATUS FOR PULLING WIRE

BACKGROUND OF THE INVENTION

1. Field of the Invention

The present invention relates to a method and apparatus for pulling and stringing wire through building walls and ceilings.

2. Description of the Prior Art

Resilient and flexible mesh sleeves formed of a plurality of thin, flexible strands made up of polyester monofilaments and woven or braided together are old and well known. Such sleeves, known as expandable sleeving or tubing, expand in diameter upon longitudinal compression and contract in diameter upon longitudinal tension or extension. The woven sleeves are similar in construction to the ancient and well-known Chinese Finger Trap.

Expandable sleeving of this type is commonly used to contain and shield multiple strands of wire, cable and the like. One form of such sleeving is manufactured by TechFlex, Inc. of Sparta, N.J., and sold under the trademarks "Flexo" and "Clean Cut." The product is made of polyester monofilament and is durable, temperature resistant, fray resistant, wear resistant, non-stretchable, flexible and resilient.

The use of woven sleeves for pulling cable such as fiber-optic cables having connector fittings thereon is shown in U.S. Pat. No. 5,480,203, issued Jan. 2, 1996, to Hubbell Incorporated, for "Pulling Tool For Pulling Connectorized Cable."

OBJECTS OF THE INVENTION

It is an object of the present invention to provide a new and improved method and tool system for stringing wire or cable in building structures.

It is another object of the present invention to provide a new and improved combination of tools for stringing wire or cable in building structures.

A further object of the present invention is to provide a method of the foregoing character that is simple, easy and efficient to use and facilitates the rapid and accurate installation of wire and cable in building structures.

SUMMARY OF THE INVENTION

The present invention is embodied in a new and novel method and apparatus or tool system for pulling wire through a building wall or panel formed by spaced apart vertical studs, a plate at one or both ends of the studs, and opposed wall panels mounted on the studs and plates. In order to string a wire through the wall panel, an opening is cut through one of said wall panels between said studs, usually of the size of a standard outlet box. An elongated stiffly flexible drill bit is inserted through the opening and into the space or channel between the panels and studs. A hole is then drilled through a plate, usually the upper plate, and the drill is withdrawn. An elongated stiffly flexible rod carrying an elongated flexible woven sleeve, is inserted through the panel opening and through the drilled hole in the plate. The sleeve is of a substantial length and is laterally expandable upon longitudinal compression and laterally contractible upon longitudinal tension, in the nature of a Chinese Finger Trap. The rod is at least partially covered with one end portion of the flexible woven sleeve which grips said rod when under tension. After insertion through the drilled hole in the plate, the rod and sleeve are slightly retracted from the hole resulting in the formation of a loop in the sleeve at the inserted end of the rod extending above the plate. This loop is hooked or snagged with an elongated hooking rod having a hook at one end. Once hooked, the sleeve is pulled completely through the hole to a point remote from the hole and to which a wire is to be strung.

At either the first point at which one end of the cable or wire is to be located, or at the remote point, the free end of said sleeve is grippingly engaged with an inserted end of a wire or cable to be pulled by inserting an end of the wire into the sleeve and tensioning the sleeve to grip the wire. The sleeve and attached wire are pulled through the plate hole and panel opening. After the wire or cable is in place, the wire is readily released from the sleeve by compressing the woven sleeve in a longitudinal direction, leaving the wire strung between the remote point outwardly through the wall opening.

DESCRIPTION OF THE DRAWINGS

FIG. 1 is a perspective view of a long woven sleeve used in the present invention.

FIG. 2 is a perspective view of an elongated flexible rod used in the present invention.

FIG. 3 is a perspective view of a hooked fishing rod used in the present invention.

FIG. 4 is a perspective view of a drill and long drill bit used in the present invention.

FIG. 5 is a perspective view of a coil of wire used in the present invention.

FIG. 11C is a section view taken substantially in the plane of line 11C—11C on FIG. 11B.

FIG. 12D is a section view taken substantially in the plane of line 12D—12D on FIG. 12C.

FIG. 12E is a section view similar to FIG. 12D but showing the hooked rod pulling the woven sleeve.

DESCRIPTION OF THE PREFERRED EMBODIMENT

Figure 6:
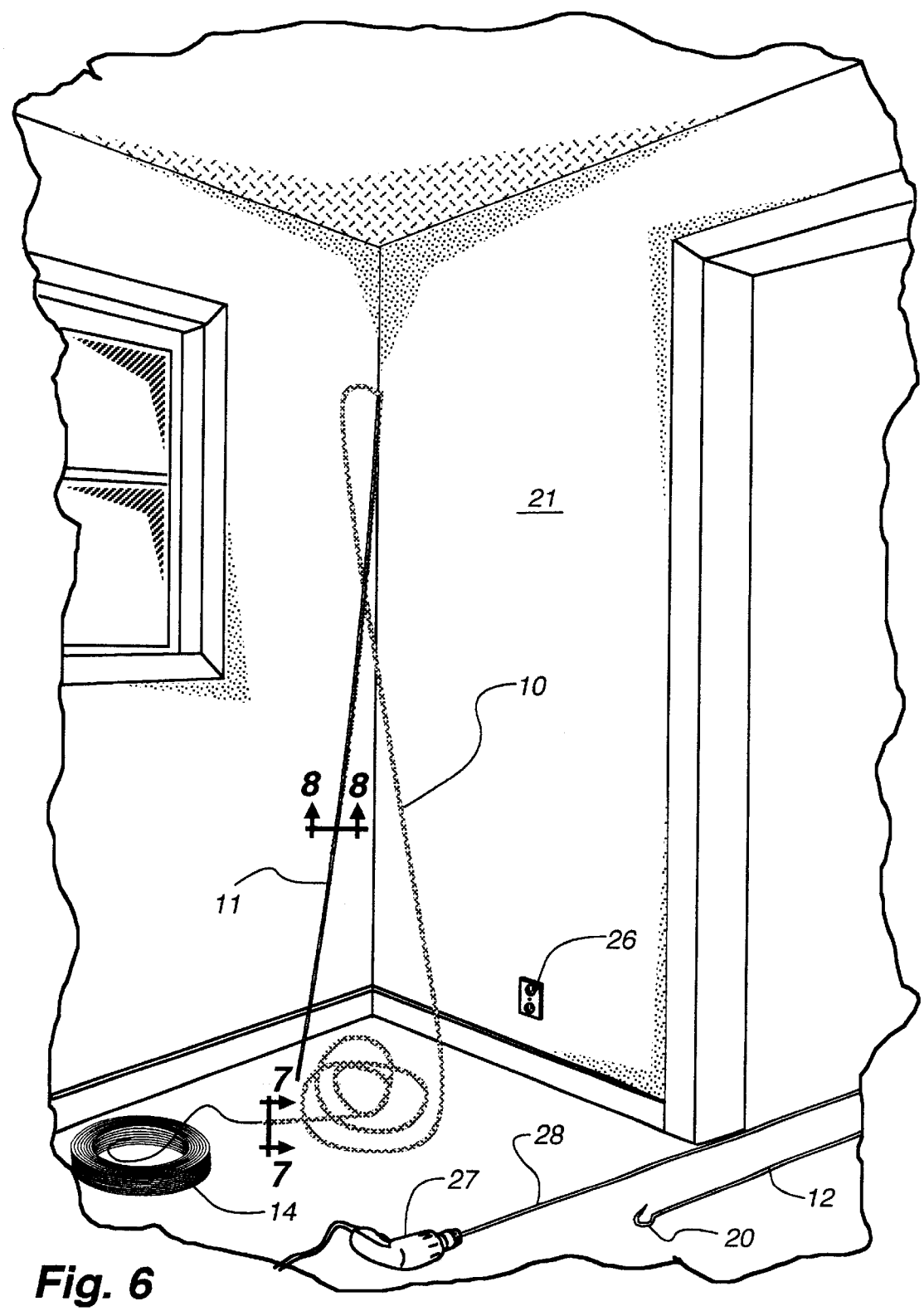
FIG. 6 is a perspective view of the elements of the present invention assembled for use in the present invention.
Figure 10:
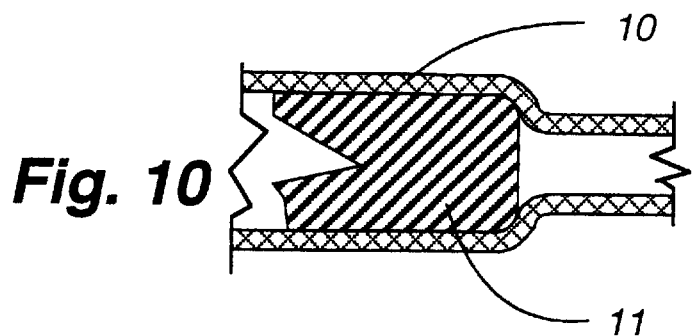
FIG. 10 is a section view taken substantially in the plane of line 10—10 on FIG. 8.
Figure 8:
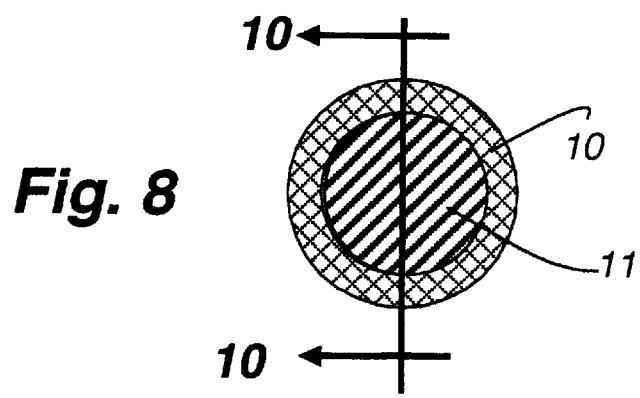
FIG. 8 is a section view taken substantially in the plane of line 8—8 on FIG. 6.
Figure 9:
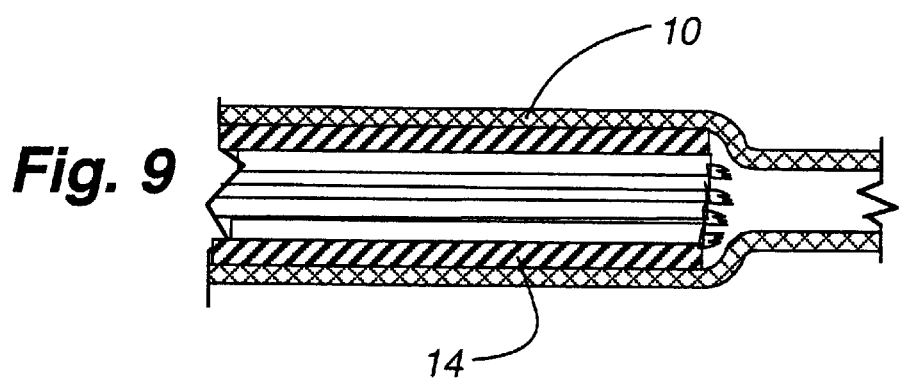
FIG. 9 is a section view taken substantially in the plane of line 9—9 on FIG. 7.
Figure 7:
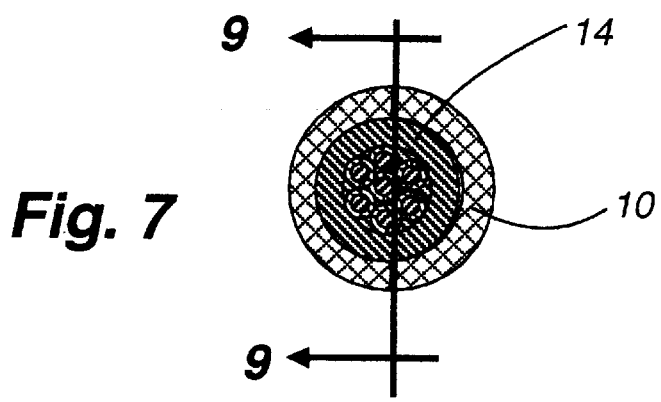
FIG. 7 is a section view taken substantially in the plane of line 7—7 on FIG. 6.

The present invention is embodied in a new and improved method for pulling and stringing wire through building walls and ceilings, whether new or old buildings, and in the apparatus or tools for practicing the method. The invention embodies in part a new use of existing materials or devices.

The wire stringing tools used in the novel method include a long slim woven tubular sleeve 10 (FIG. 1); a slim, elongated, glass fiber rod 11 (FIG. 2); and a long, flexible hooked pole 12 (FIG. 3). The glass fiber rod 11 has a length of about six feet and a diameter of about ⅛-inch. The rod is stiffly flexible and may be bent about a radius of about six inches or greater. The woven tube or sleeve 10 has a length of about ten to at least about thirty feet or more, and even as long as 100 feet or more, and a diameter sufficient to tightly encase the glass fiber rod 11 or an inserted end of a wire 14 (FIG. 5) being pulled. The diameter of a nominal ⅛-inch woven sleeve is about ⅛ inch when the sleeve is under tension. When longitudinally compressed, that is compressed along its longitudinal axis, the woven sleeve expands to about ¼ inch in diameter. The cut ends 15, 16 of the tube 10 are fused and slightly flared to prevent raveling or fraying and to facilitate insertion of a rod 11 or wire 14 into a cut end thereof.

The woven sleeve 10 has a slick or slippery outer surface and when a wire is inserted therein, the surface of the sleeve facilitates stringing of the wire through rough-edged holes so that the wire does not hang up even when pulled at right angles to the hole or passage. This further facilitates stringing wire through long chases.

The hooked pole 12 may be unitary or made up of one or more sections (not shown) of flexible rod secured together by threaded couplings or the like (not shown) and is provided with a wire engaging pulling hook 20 on one end (FIG. 3).

Figure 11A:
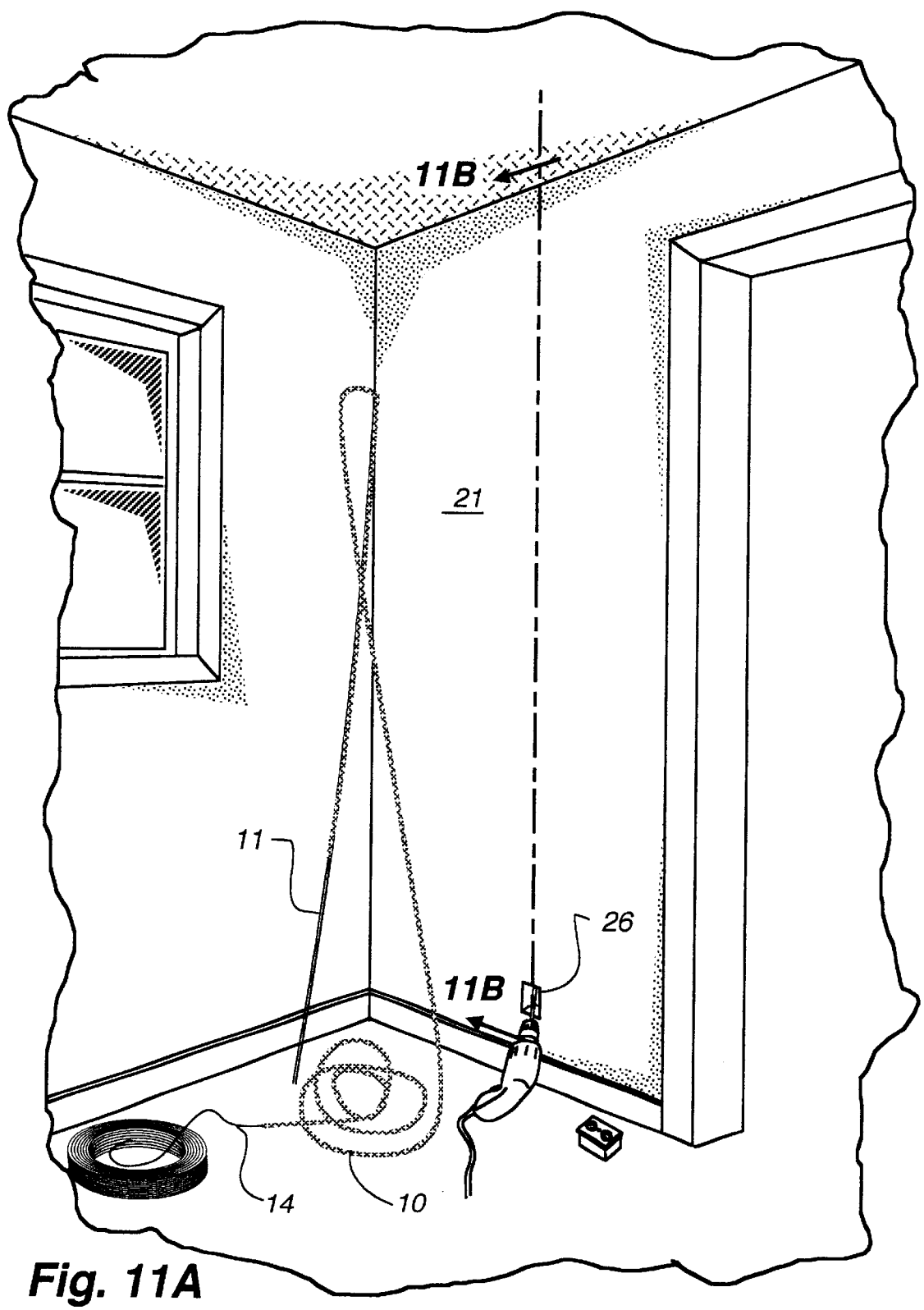
FIG. 11A is a view similar to FIG. 6 but showing the drill and bit in position for drilling a hole in the wall header.
Figures 11B, 12B, 12C:
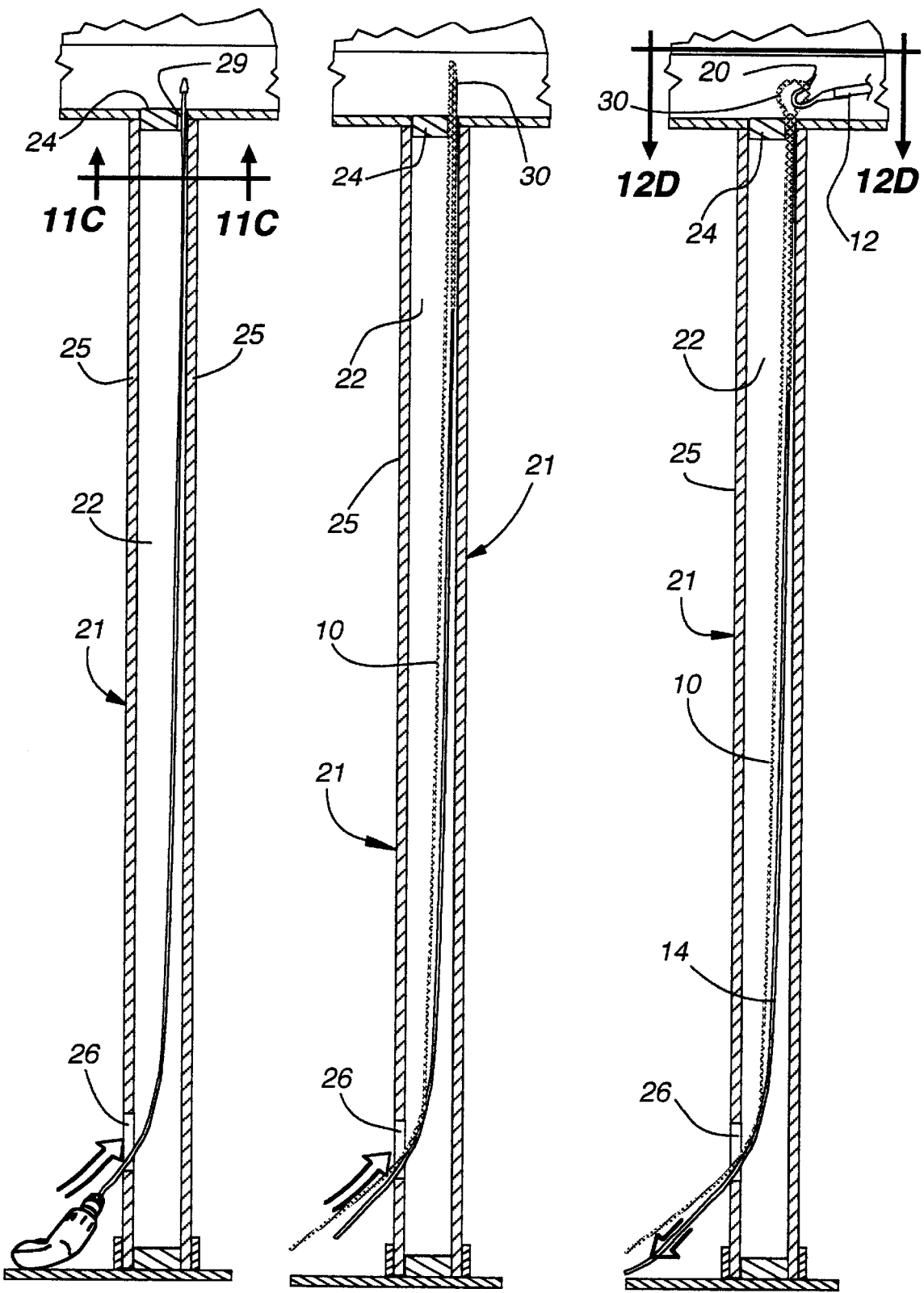
FIG. 11B is a section view taken substantially in the plane of line 11B—11B on FIG. 11A.
FIG. 12B is a section view taken substantially in the plane of line 12B—12B on FIG. 12A.
FIG. 12C is a section view similar to FIG. 12B but showing the woven sleeve and rod forming a loop for engagement by the hooked rod.
Figure 12A:
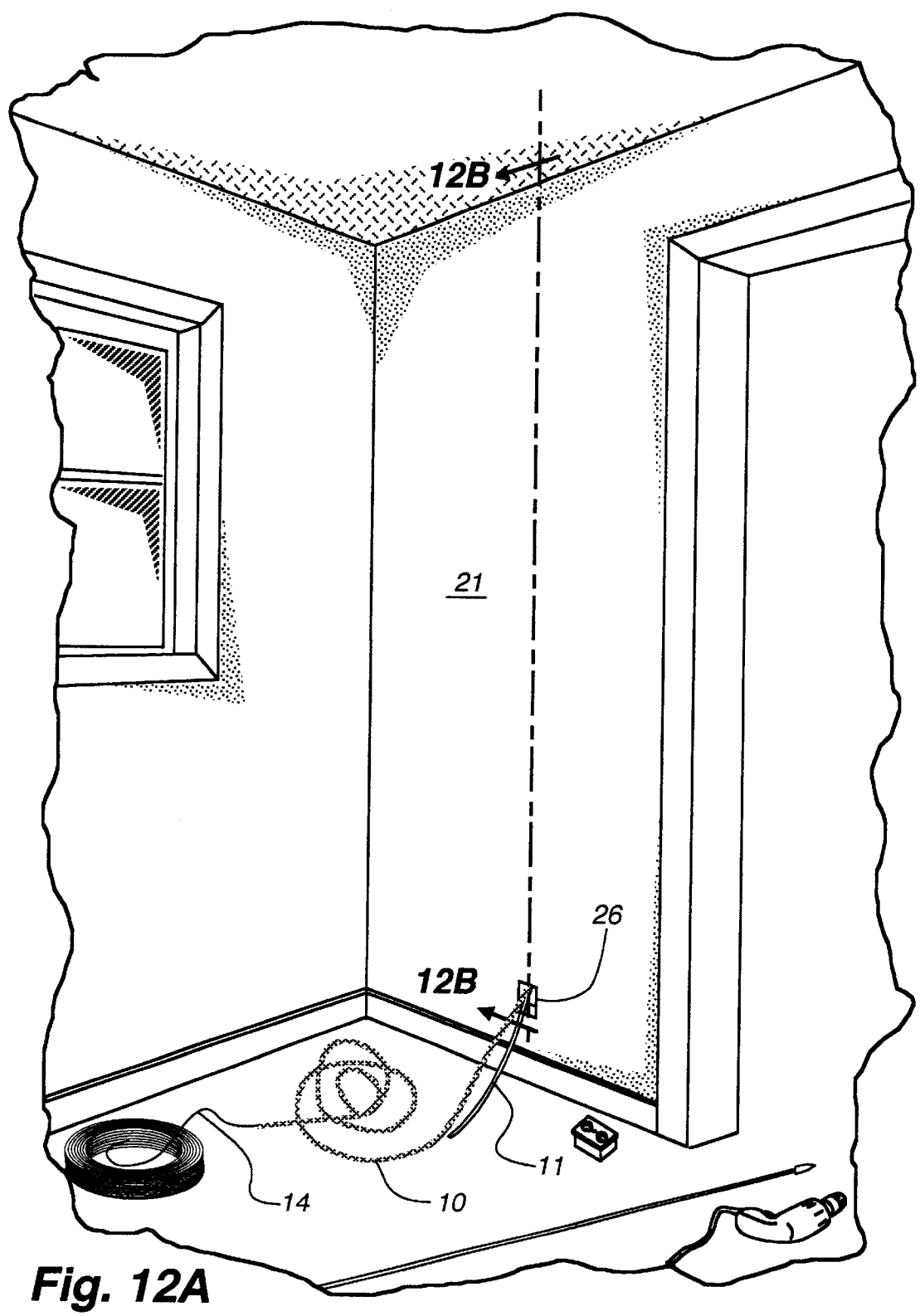
FIG. 12A is a view similar to FIG. 11A but showing the drill bit removed and the woven sleeve and carrying rod in place for stringing wire.
Figure 13:
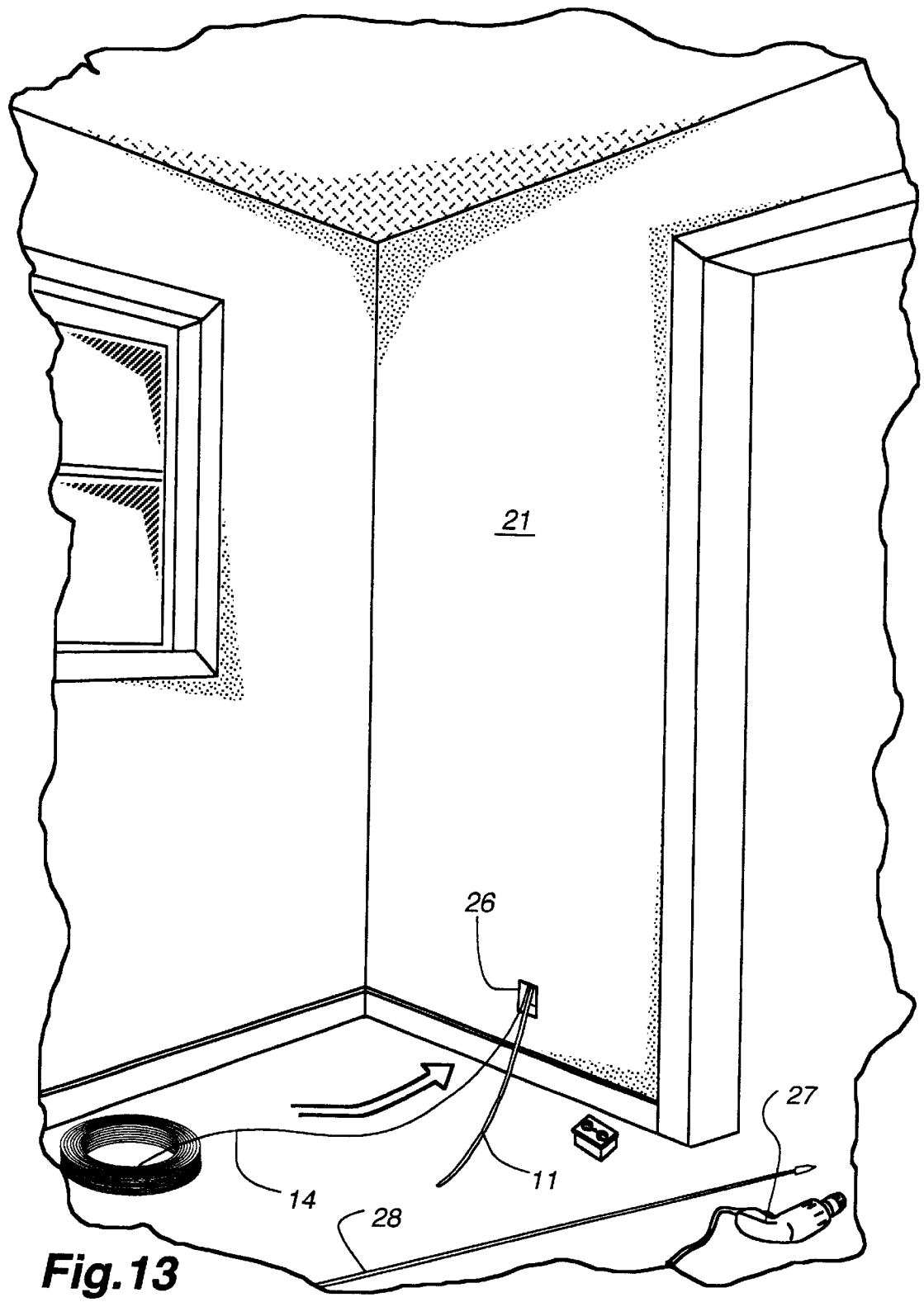
FIG. 13 is a view similar to FIG. 12A but showing the wire pulled through the outlet box opening.

The present invention is further embodied in a method for utilizing the foregoing tools for a pulling wire or cable through a wall or panel 21 of a building structure. The wall or panel is conventionally formed by spaced apart vertical studs 22 with a plate 24 secured thereto at one or both ends, as shown in FIGS. 11B and 12B. Opposed wall panels 25 are mounted on said studs 22 and plate 24 to form the wall or panel 21, as shown in FIG. 13. In most building structures, a crawl space (not shown) is conventionally provided above the panels and studs. Where it is desired, for example, to string or run a wire or cable 14 between a remote location and an outlet opening 26 in one wall panel 22 of the wall structure, as shown in FIGS. 11B, 12B, and 12C, such an outlet opening 26 is cut in the wall panel 25 at the desired position. By using a power drill 27 equipped with a long flexible drill bit 28, such as shown in U.S. Pat. No. 4,906,146, a hole is drilled in the plate 24 above the opening 26, as shown in FIG. 11B. To this end, the drill bit 28 is extended through the wall opening 26 and guided by the intersection of a wall panel 25 and stud 22, drills a hole 29 in the plate 24 extending between the crawl space and the space between the panels 25 and studs 22, as shown in FIGS. 11B, 11C, and 12B.

A stiffly flexible glass fiber rod 11 is at least partially, and preferably fully covered with one end of a long, approximately thirty or more feet in length, of ⅛ inch expandable sleeve or tubing 10. The covered rod and a portion of the sleeve 10 are inserted through the hole 26 in the wall and extended upwardly through the hole 29 in the plate 24, as shown in FIG. 12B, and into the crawl space. By slightly retracting the rod 11, a loop 30 is formed in the woven sleeve 10 above the plate 24, as shown in FIG. 12B. Entering the crawl space through a trap door (not shown), the installer engages the loop 30 with the hook 20 on a hooked pole 12 and pulls the remaining length of woven sleeve 10 through the hole 29 in the plate to a location remote from the initial wall opening 26.

A wire or cable 14 to be strung between the two locations may be inserted in the free cut end of the woven tubing or sleeve 10 at the wall opening 26, as shown in FIG. 6, or the woven sleeve 10 may be pulled to the remote point and the wire or cable 14 inserted there. In either case, the sleeve 10 is engaged at its free end with a wire 14 to be fed through the wall opening 26 and hole 29, as shown in FIG. 11B. When the wire 14 is engaged by insertion of a cut end thereof into the expandable sleeve at the remote point, the sleeve covered rod and sleeve together with the wire is pulled back through the hole in the plate and the wall opening. When the wire is engaged with the woven sleeve 10 at the initial opening 26, it is disengaged therefrom after being pulled to the remote point and the rod and tubing is pulled back through the wall opening. In this manner the wire is extended between a remote location and the wall opening where it is engaged with any appropriate circuit or device. The wire is readily disengaged from the expandable sleeve or tubing by slightly longitudinally compressing the woven sleeve and removing the wire.

The foregoing wire pulling procedure can be repeated at any desired number of locations. The method facilitates, for example, the stringing of speaker wire, communication wire, alarm cable, and the like in building structures whether new or old.

While an illustrative embodiment of applicant's method and apparatus for pulling wire has been shown in the drawings and described above in detail, there is no intention to limit the scope of the invention to the specific methods and tool system or apparatus disclosed. On the contrary, applicant intends to include in the scope of the invention as defined in the claims all modifications, alternative constructions, steps, equivalents and uses thereof. In particular, applicant intends to include all equivalents of the steps and elements as defined in the claims whether original or amended.

What is claimed is:

1. A method of pulling wire through a wall or panel formed by spaced apart vertical studs, a plate at one end of said studs, and opposed wall panels mounted on said studs, comprising:

cutting an opening through one of said wall panels between said studs;

inserting an elongated stiffly flexible drill bit through said opening between said panels, drilling a hole through said plate, and removing said drill;

covering an elongated stiffly flexible rod with an elongated flexible woven sleeve having cut ends by extending said rod at least partially into said sleeve through one of said cut ends, said sleeve having a substantial length and being laterally expandable upon longitudinal compression and laterally contractible upon longitudinal tension, said flexible woven sleeve gripping said inserted rod when under tension;

inserting said covered end of said rod through said opening, between said panels and through said drilled hole in said plate; slightly retracting said rod and sleeve to form a loop in said sleeve at the inserted end of said rod extending through said hole in said plate;

hooking said loop with an elongated hooking rod;

pulling said sleeve completely through said hole to position its other end at a point remote therefrom;

grippingly engaging an inserted end of a wire with the free cut end of said sleeve at either the remote point or the wall opening;

pulling on said sleeve to pull said wire between said wall opening and said remote point;

releasing said wire from said sleeve by longitudinally compressing said sleeve; and removing said sleeve from said wall opening; whereby said wire is strung between said remote point and said opening.

2. A method as defined in claim 1 wherein said sleeve is at least about ten feet long.

3. A method as defined in claim 1 wherein said sleeve is at least about thirty feet long.

4. A method as defined in claim 1 wherein said rod is a glass fiber rod.

5. A method as defined in claim 1 wherein said sleeve is woven from strands of monofilament polyester.

6. A method as defined in claim 5 wherein the cut ends of said sleeve are fused and flared.

7. A method of pulling a wire through a hidden but accessible hole, comprising:

inserting through said hole an elongated stiffly flexible rod at least partially covered with a long flexible woven sleeve, said sleeve having cut ends and being laterally expandable upon longitudinal compression and laterally contractible upon longitudinal tension, said rod being inserted into one of said cut ends;

pulling said inserted sleeve through said hole from one side thereof to the other side to position the other of said sleeve ends at said other side;

grippingly engaging an inserted end of a wire with the free cut end of said sleeve before or after pulling said sleeve through said hole;

pulling said sleeve to pull said wire through said hole; and releasing said wire from said sleeve by longitudinally compressing said sleeve after pulling said wire through said hole;

whereby said wire is strung through said hole.

8. A method of pulling wire through a wall or panel formed by spaced apart vertical studs, a plate at one end of said studs, and opposed wall panels mounted on said studs, comprising:

cutting an opening through one of said wall panels between said studs;

inserting an elongated stiffly flexible drill bit through said opening between said panels, drilling a hole through said plate, and removing said drill;

covering an elongated stiffly flexible glass fiber rod with an elongated flexible monofilament polyester woven sleeve having cut and flared ends by extending said rod at least partially into said sleeve through one of said cut ends, said sleeve being of a length between about ten feet and about one hundred feet and being laterally expandable upon longitudinal compression and laterally contractible upon longitudinal tension, said flexible woven sleeve gripping said inserted rod when under tension;

inserting said covered end of said rod through said opening, between said panels and through said drilled hole in said plate;

slightly retracting said rod and sleeve to form a loop in said sleeve at the inserted end of said rod extending through said hole in said plate;

hooking said loop with an elongated hooking rod;

pulling said sleeve completely through said hole to position its other cut end at a point remote therefrom;

grippingly engaging an inserted end of a wire with the other cut end of said sleeve before or after pulling said sleeve through said hole;

pulling said sleeve to pull said wire through said hole; and releasing said wire from said sleeve by longitudinally compressing said sleeve, whereby said wire is strung between said remote point and said opening.

9. A method of pulling wire through a hidden but accessible hole comprising:

inserting through said hole a portion of a long flexible woven sleeve, said sleeve having free ends, and said sleeve being laterally expandable upon longitudinal compression and laterally contractible upon longitudinal tension, the inserted portion of said sleeve being intermediate its said ends;

engaging said inserted portion of said sleeve and pulling said inserted sleeve through said hole to position one end at a point remote from said hole and the other end at a point adjacent said hole;

grippingly engaging an inserted end of a wire with said other end of said sleeve;

pulling on said one end of said sleeve to pull said sleeve and wire from said remote point through said hole; and releasing said wire from said sleeve by longitudinally compressing said sleeve, whereby said wire is strung between said hole and said remote point.

\* \* \* \* \*